(12) United States Patent
Cho (10) Patent No.: US 10,321,250 B2
(45) Date of Patent: Jun. 11, 2019

(54) APPARATUS AND METHOD FOR CONTROLLING SOUND IN VEHICLE

(71) Applicants: Hyundai Motor Company, Seoul (KR); Kia Motors Corporation, Seoul (KR)

(72) Inventor: Sung Tae Cho, Uiwang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/609,805

(22) Filed: May 31, 2017

(65) Prior Publication Data

US 2018/0176684 A1 Jun. 21, 2018

(30) Foreign Application Priority Data

Dec. 16, 2016 (KR) .................. 10-2016-0172990

(51) Int. Cl.
| | |
|---|---|
| *H04B 1/08* | (2006.01) |
| *H04R 29/00* | (2006.01) |
| *G06F 3/16* | (2006.01) |
| *H04R 5/04* | (2006.01) |

(52) U.S. Cl.
CPC ........... *H04R 29/001* (2013.01); *G06F 3/165* (2013.01); *H04R 5/04* (2013.01); *H04R 2499/13* (2013.01)

(58) Field of Classification Search
CPC ........ H04R 3/12; H04R 29/00; H04R 29/004; H04R 29/007; H04R 29/001; H04R 5/04; H04B 1/082; G10K 2210/128; G10K 2210/1282; H04M 9/082; H04M 1/6091; G06F 3/165; H03G 5/165; H04S 7/30; H04S 2400/01
USPC ........ 381/56, 86, 57, 58, 71.4, 302, 123, 17, 381/365

See application file for complete search history.

(56) References Cited

U.S. PATENT DOCUMENTS

| | | | | |
|---|---|---|---|---|
| 2006/0262935 | A1* | 11/2006 | Goose | H04S 3/002 381/17 |
| 2007/0280486 | A1 | 12/2007 | Buck et al. | |
| 2011/0286614 | A1* | 11/2011 | Hess | H04S 7/303 381/302 |
| 2016/0119712 | A1* | 4/2016 | Tzirkel-Hancock | H04R 1/406 381/86 |
| 2016/0127827 | A1* | 5/2016 | Tzirkel-Hancock | H04R 3/002 381/71.4 |
| 2018/0056832 | A1* | 3/2018 | Oswald | B60N 2/879 |

FOREIGN PATENT DOCUMENTS

| | | |
|---|---|---|
| KR | 10-2007-0091942 A | 9/2007 |
| KR | 10-2007-0105260 A | 10/2007 |
| KR | 10-2016-0084509 A | 7/2016 |
| KR | 10-1638047 B1 | 7/2016 |

\* cited by examiner

*Primary Examiner* — Paul Kim
*Assistant Examiner* — Ubachukwu A Odunukwe
(74) *Attorney, Agent, or Firm* — Morgan, Lewis & Bockius LLP (57) ABSTRACT

An apparatus and a method for controlling sound in a vehicle may include a sound detector that detects a sound output position at which the sound is output in the vehicle, and a processor that changes a sound position in the vehicle based on the sound output position detected by the sound detector.

7 Claims, 7 Drawing Sheets

APPARATUS AND METHOD FOR CONTROLLING SOUND IN VEHICLE

CROSS-REFERENCE TO RELATED APPLICATION

The present application claims priority to Korean Patent Application No. 10-2016-0172990, filed on Dec. 16, 2016, the entire contents of which is incorporated herein for all purposes by this reference.

BACKGROUND OF THE INVENTION

Field of the Invention

The present invention relates to an apparatus and a method for controlling sound in a vehicle, which are capable of automatically changing a sound position based on a position of a sound system of outputting sound in the vehicle.

Description of Related Art

Various additional devices are installed and operated in a vehicle for the convenience of a driver and a passenger. For example, there is an audio video navigation (AVN) system into which an in-vehicle multimedia device and a navigation system are integrated as one system. The audio signal output from such an AVN system is output through a plurality of speakers installed in the vehicle.

In addition, in recent years, as the performance of a central processing unit (CPU) and a graphic processing unit (GPU) of the AVN system has been enhanced, it is possible to independently reproduce video and music contents between front and rear seats or between left and right rear seats.

However, although a conventional vehicle controls a volume leveler according to the content type of an audio signal or controls the volume according to the environment given to a user, the sound is not provided in consideration of a seat position of the user who instructs to output the sound. Thus, according to the related art, it is impossible to provide optimal sound to the user who instructs to output the sound.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling sound in a vehicle, which can automatically change a sound position based on a position of a sound system which outputs sound in the vehicle.

In addition, various aspects of the present invention are directed to providing an apparatus and a method for controlling sound in a vehicle, which can return a sound position to a previous sound position before a changing of the sound position when a specific event including termination of use of a microphone, use of an earphone, a stop of a route message, and the like, occurs.

The technical problems to be solved by the present inventive concept are not limited to the aforementioned problems, and any other technical problems not mentioned herein will be clearly understood from the following description by those skilled in the art to which the present invention pertains.

According to various aspects of the present invention, an apparatus for controlling sound in a vehicle includes a sound detector that detects a sound output position at which the sound is output in the vehicle, and a processor that changes a sound position in the vehicle based on the sound output position detected by the sound detector.

The sound detector may detect a player which outputs sound last among a plurality of players which are disposed at different positions in the vehicle to reproduce multimedia.

The plurality of players may include a first player located at a front seat in the vehicle, a second player located at a left rear seat in the vehicle, and a third player located at a right rear seat in the vehicle.

The sound detector may detect whether a microphone is operated.

The processor may change the sound position in consideration of the detected sound output position and whether the microphone is operated.

The sound detector may detect sound output from a navigation system.

The processor may change the sound position based on the detected sound output position and whether the navigation system outputs the sound.

The apparatus may further include an external device connection detection device configured to detect whether an external device is connected.

The processor may change the sound position in consideration of the detected sound output position and whether the external device is connected.

The processor may return the changed sound position to the sound position before the change of the sound position when a sound position return condition is satisfied.

According to another aspect of the present invention, a method of controlling sound in a vehicle includes detecting a sound output position at which the sound is output in the vehicle, determining whether to change a sound position, based on the sound output position, and changing the sound position based on the sound output position when it is determined to change the sound position.

The detecting of the sound output position may include detecting a player which outputs sound last among a plurality of players which are disposed at different positions in the vehicle.

The detecting of the sound output position may include detecting whether a microphone is used and a navigation system outputs sound.

The determining of the changing of the sound position may include determining whether to change the sound position based on the sound output position and whether the microphone is used.

The determining of the changing of the sound position may include determining whether to change the sound position based on the sound output position and whether the navigation system outputs sound.

The method may further include, after the detecting of the sound output position, detecting whether an external device is connected.

The determining of the changing of the sound position may include determining whether to change the sound position based on the sound output position and whether the external device is connected.

The method may further include, after the changing of the sound position, confirming whether a sound position return condition is satisfied, and changing a sound position into the sound position before the change when a sound position return condition is satisfied.

The confirming of whether the sound position return condition is satisfied may include confirming whether one of conditions of termination of use of a microphone, termination of sound output of the navigation, and connection of an external device is satisfied.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Throughout the specification, when some part 'comprises', 'includes' or 'has' some elements, unless explicitly described to the contrary, it means that other elements may be further included but not excluded.

In addition, the terms '-unit', '-or(er)', and 'module' described in the specification mean units for processing at least one function or operation, which can be implemented by hardware or software and any combination thereof. In addition, as used in the specification, the singular forms 'a', 'an', 'one', and 'the' are intended to include the plural forms as well unless the context clearly dictates otherwise or it is explicitly stated otherwise.

Hereinafter, embodiments of the present invention will be described in detail with reference to accompanying drawings.

Figure 1:
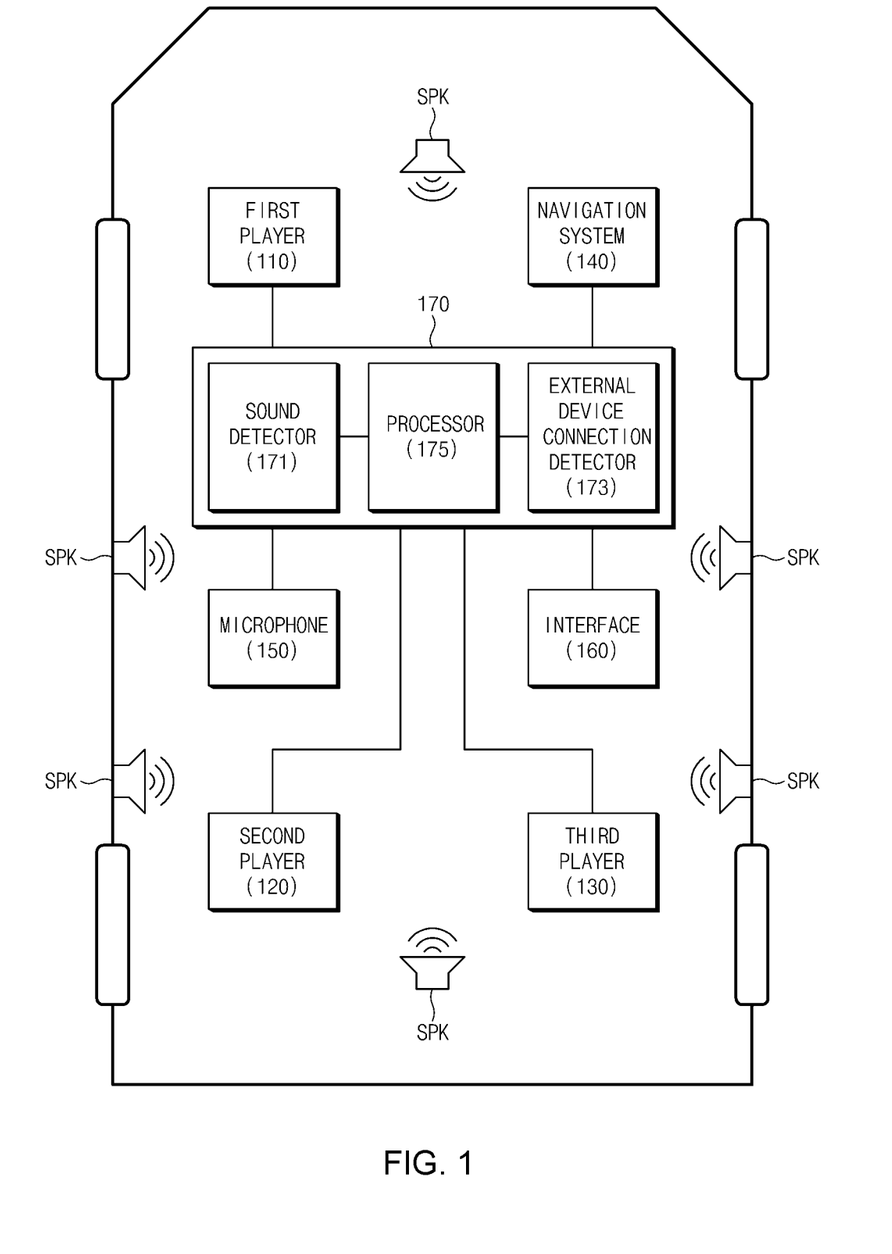
FIG. 1 is a block diagram illustrating an apparatus for controlling sound in a vehicle according to an exemplary embodiment of the present invention.

FIG. 1 is a block diagram illustrating an apparatus for controlling sound in a vehicle according to an exemplary embodiment of the present invention.

As illustrated in FIG. 1, an apparatus for controlling sound control includes a first player 110, a second player 120, a third player 130, a navigation system 140, a microphone 150, an interface 160, and a sound controller 170.

The first player 110 is disposed near a front seat in a vehicle. For example, the first player 110 may be disposed on a front center fascia in the vehicle. The first player 110 may be controlled by a user sitting on a driver seat or a passenger seat.

The second player 120 and the third player 130 are disposed near left and right rear seats in the vehicle, respectively. For example, the second player 120 is disposed on a front surface of the left rear seat, that is, a rear surface of the driver seat and the third player 130 is disposed on a front of the right rear seat, that is, a rear surface of the passenger seat.

The first to third players 110 to 130, which are sound systems, may reproduce multimedia data independently from each other. Each of the first to third players 110 to 130 includes a user interface and a display.

Each of the first to third players 110 to 130 reproduces multimedia data to output a video signal to its display and an audio signal to speakers SPK disposed in the vehicle. The multimedia data include video, audio, music contents, etc. The speakers SPK are disposed at the front, side and rear of the vehicle.

The first to third players 110 to 130 may reproduce multimedia data previously stored in a memory or may receive multimedia data through wireless communication in a streaming scheme to reproduce the multimedia data in real time.

The navigation system 140 outputs a route message or warning message to the speakers SPK. The navigation system 140 maps position data received through a global positioning system (GPS) receiver and map data to display a path to a predetermined destination and a current vehicle position on a display screen.

The microphone 150 is disposed near the front seat of the vehicle to receive a voice signal. The microphone 150 processes an audio signal received therethrough from an outside in a telephone call, a voice memo, voice recognition, and the like to generate electrical voice data.

The interface 160 connects the sound control apparatus to an external device. The external device may include an earphone, a wireless headset, a hands-free earphone, a tablet computer, a mobile terminal, and the like. The interface 160 receives data from an external device or transmits data to the external device. For example, the interface 160 may include a wire/wireless headset, a wire/wireless data port, a memory card port, an audio input/output (I/O) port, a video I/O port, an earphone port, and the like.

In the exemplary embodiment, although it is described that the interface 160 is separated from the first to third players 110 to 130, each of the first to third players 110 to 130 may include the interface 160. For example, each of the first to third players 110 to 130 may include an audio I/O port.

The sound controller 170 includes a sound detector 171, an external device connection detector 173, and a processor 175. The sound controller 170 may be implemented with a head unit (HU) and the processor 175 may be implemented with a digital signal processor (DSP).

The sound detector 171 detects a player which outputs sound (or an audio signal) last among the first to third players 110 to 130. The sound detector 171 may identify a player which outputs sound last, by use of unique identification information of each player 110, 120 or 130.

The sound detector 171 informs the processor of the seat position of the detected player. For example, when the first player 110 is detected, the sound detector 171 determines that the sound is output (reproduced) from the front seat. When the second player 120 is detected, the sound detector 171 determines that the sound is output from the left rear seat. When the third player 130 is detected, the sound detector 171 determines that the sound is output from the right rear seat.

The sound detector 171 detects whether the microphone 150 is used (operated). For example, the sound detector 171 confirms whether an audio signal is input from the microphone 150. In addition, the sound detector 171 detects the turn-on or -off of the microphone 150.

In the exemplary embodiment, although it is described that the sound detector 171 confirms whether the microphone 150 is used, as one example, the embodiment is not limited thereto and the sound detector 171 may confirm whether a hands-free earphone is connected.

The sound detector 171 confirms whether an audio signal (sound) is output from the navigation system 140. For example, the sound detector 171 confirms whether a route message, a warning message, and the like are output.

The external device connection detector 173 confirms whether an external device connected through the interface 160 exists. For example, the external device connection detector 173 confirms whether an earphone is connected to the audio I/O port.

The processor 175 automatically changes a sound position based on a sound output position. The sound position is a position at which sound is heard the loudest to a user. The processor 154 allows the output gain of a speaker to be gradually increased toward the sound position and to be gradually decreased away from the sound position. For example, when the sound position is set to the front seat in the vehicle, the processor 175 raises the output gain of the speaker located at the front of the vehicle and lowers the output gain of the speaker located at the rear of the vehicle.

The processor 175 determines the sound output position based on the position of the detected player which outputs sound last, whether the microphone 150 is used, and whether the navigation 160 outputs sound.

For example, when the first player 110 is detected as a player which outputs sound last, the use of the microphone 150 is detected, or the sound output of the navigation system 160 is detected, the processor 175 determines that the sound is output from the front seat of the vehicle.

Meanwhile, when the second player 120 is detected as a player which outputs sound last, the processor 175 determines that the sound is output from the left rear seat of the vehicle. When the third player 130 is detected as a player which outputs sound last, the processor 175 determines that the sound is output from the right rear seat of the vehicle.

In addition, the processor 175 confirms, through the external device connection detector 173, whether an external device is connected. The processor 175 determines the sound position based on the sound output position, or the sound output position and whether an external device is connected. In addition, the processor 175 compares the determined sound position with a previously set sound position (previous sound position). As the comparison result, when the determined sound position does not correspond to the previous sound position, the processor 175 determines to change the sound position. Meanwhile, as the comparison result, when the determined sound position corresponds to the previous sound position, the processor 175 maintains the previous sound position. The previous sound position may be the default sound position or the most recently set sound position.

When the processor 175 determines to change the sound position, the processor 175 changes the previous sound position into the determined sound position. The processor 175 changes the sound position in an X-axis direction (the left and right direction of the vehicle), in a Y-axis direction (the front and rear direction of the vehicle), and in a Z-axis direction (the up and down direction of the vehicle).

After changing the sound position, when a return condition is satisfied, the processor 175 returns the sound position to the sound position before the change. For example, when the use of the microphone 150 is terminated, the sound output of the navigation system 160 is ceased, or the use of the earphone is detected, the processor 175 returns the sound position to the sound position before the change.

Figure 2:
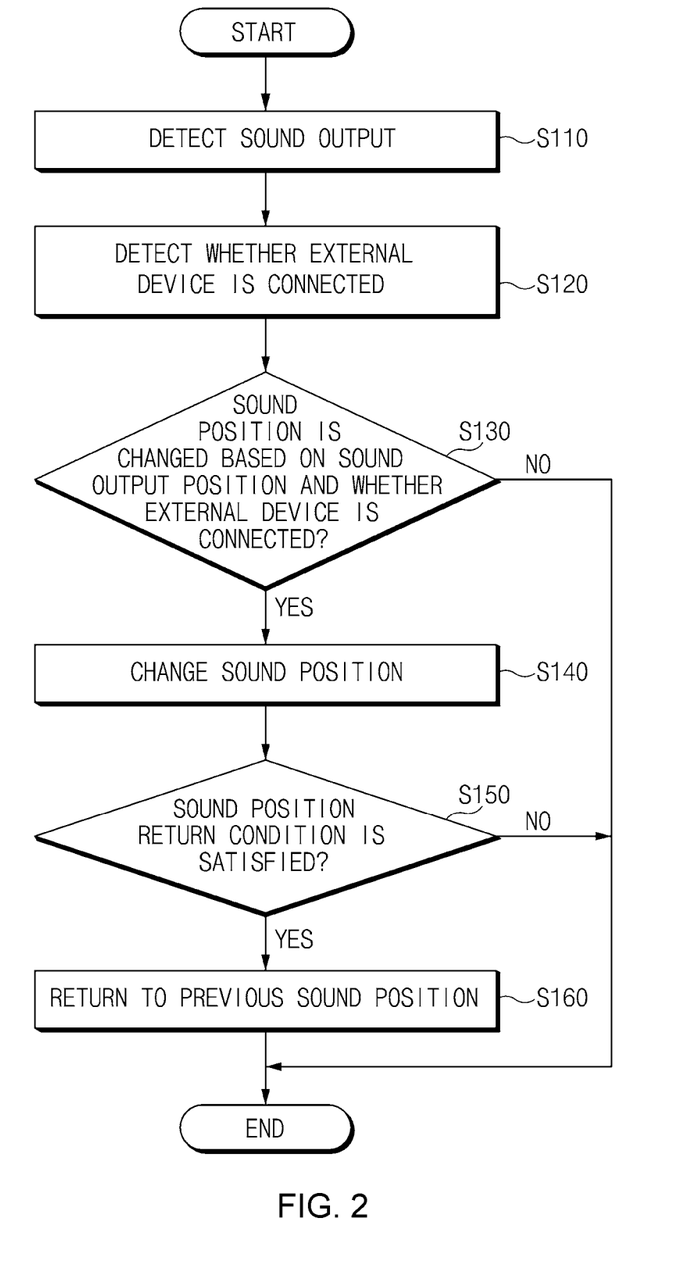
FIG. 2 is a flowchart illustrating a method for controlling sound in a vehicle according to an exemplary embodiment of the present invention.

FIG. 2 is a flowchart illustrating a method for controlling sound in a vehicle according to an exemplary embodiment of the present invention.

As illustrated in FIG. 2, in operation S110, the processor 175 detects a sound output from at least one of the first to third players 110 to 130, the microphone 150, and the navigation system 160 through the sound detector 171. When the sound output is detected, the processor 175 confirms the sound output position at which the sound output is detected.

In operation S120, the processor 175 detects whether an external device is connected through the external device connection detector 173. For example, the external device connection detector 173 confirms whether an earphone is connected to the audio I/O port and transfers the confirmation result to the processor 175.

In operation S130, the processor 175 determines whether to change the sound position based on the position (sound output position) at which the sound output is detected and whether the external device is connected. The processor 175 determines the sound position based on the sound output position, or the sound output position and whether the external device is connected. In addition, the processor 175 compares the determined sound position with a previous sound position. As the comparison result, when the determined sound position does not correspond to the previous sound position, the processor 175 determines to change the sound position. Meanwhile, as the comparison result, when the determined sound position corresponds to the previous sound position, the processor 175 determines to maintain the previous sound position.

In operation S140, when the processor 175 determines the change of the sound position, the processor 175 changes the sound position based on the sound output position or the sound output position and whether the external device is connected. The processor 175 changes the sound position into the sound position determined based on the sound output position or the sound output position and whether the external device is connected.

In operation S150, after changing the sound position, the processor 175 confirms whether the sound position return condition is satisfied. For example, the processor 175 confirms whether the position at which the sound output is detected and/or the state that the external device is connected are/is returned to the previous position and/or state.

In operation S160, when the sound position return condition is satisfied, the processor 175 changes the sound position into the sound position before the change of the sound position. For example, in the state that sound is output from the left rear seat, when the use of the microphone is detected such that the sound position is changed, when the use of the microphone 150 is terminated, the processor 175 returns the sound position to the sound position set in the state that the sound is output from the left rear seat. That is, the processor 175 returns the sound position to the sound position before the change.

Figure 3:
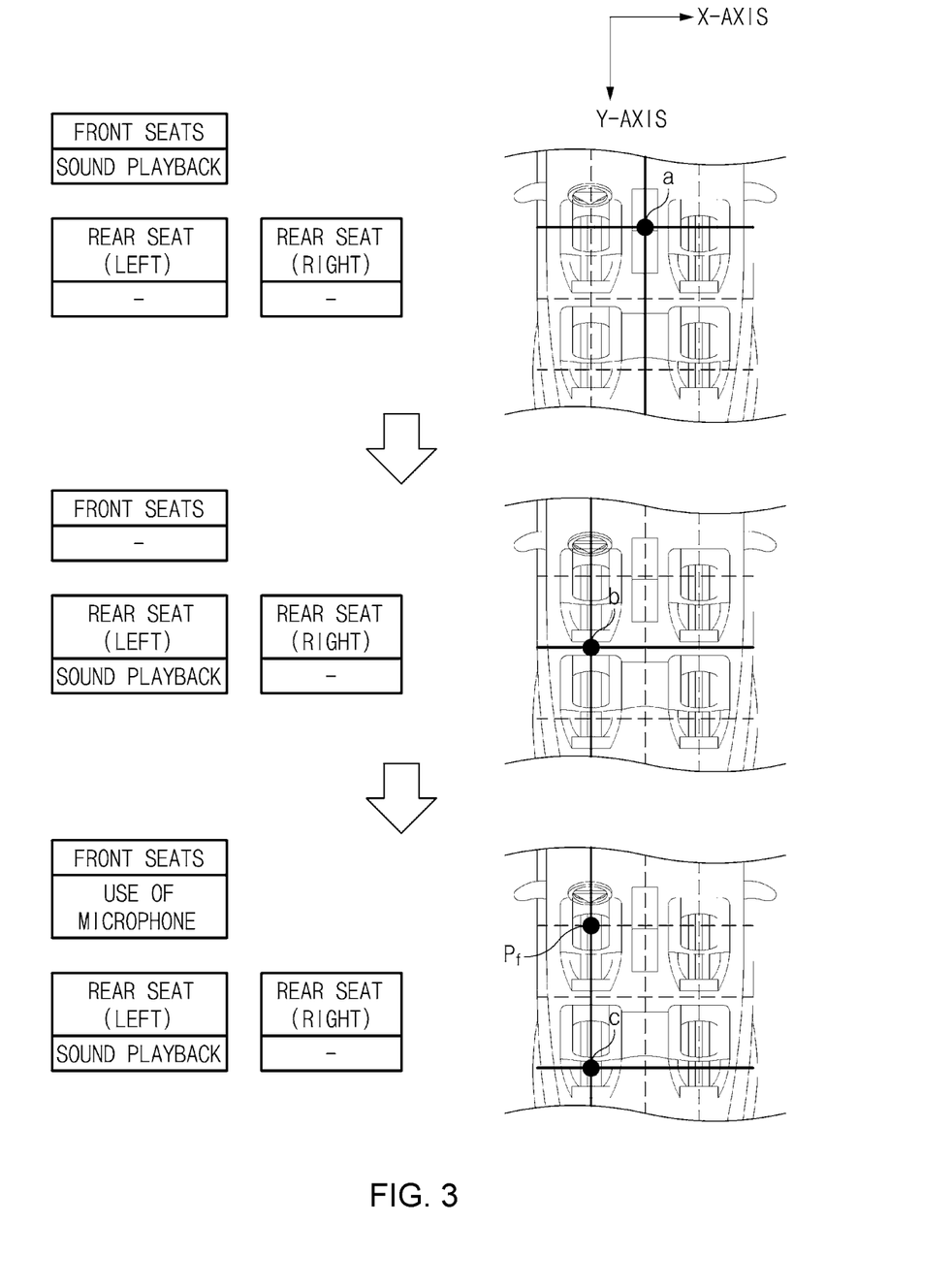
FIG. 3 is a view illustrating one example of the process of changing a sound position of an apparatus for controlling sound in a vehicle according to an exemplary embodiment of the present invention.

FIG. 3 is a view illustrating one example of the process of changing a sound position of an apparatus for controlling sound in a vehicle according to an exemplary embodiment of the present invention.

First, when the first player 110 reproduces sound, the processor 175 detects the first player 110 that outputs the sound last through the sound detector 171. When the first player 110 is detected, the processor 175 determines the front seats of the vehicle as the sound output position so that the center 'a' between the driver seat and the passenger seat is set as the sound position.

Then, when the second player 120 reproduces sound, the processor 175 detects the second player 120 that outputs the sound last through the sound detector 171, so that the processor 175 determines the left rear seat as the sound output position. Thus, the processor 175 changes the sound position from position 'a' to position 'b'. That is, the processor 175 changes the sound position into the center between the driver seat and the left rear seat.

When the user at the driver seat uses the microphone 150 while the second player 120 reproduces sound, the processor 175 detects the use of the microphone 150 through the sound detector 171. While the user at the driver seat (front seat) uses the microphone 150, the processor 175 changes the sound position from position 'b' to position 'c'. In other words, the processor 175 sets the left rear seat as the sound position.

In the instant case, the processor 175 sets the sound position of the sound (voice signal) output according to the operation of the microphone 150 as a previously determined sound position $P_f$.

Figure 4:
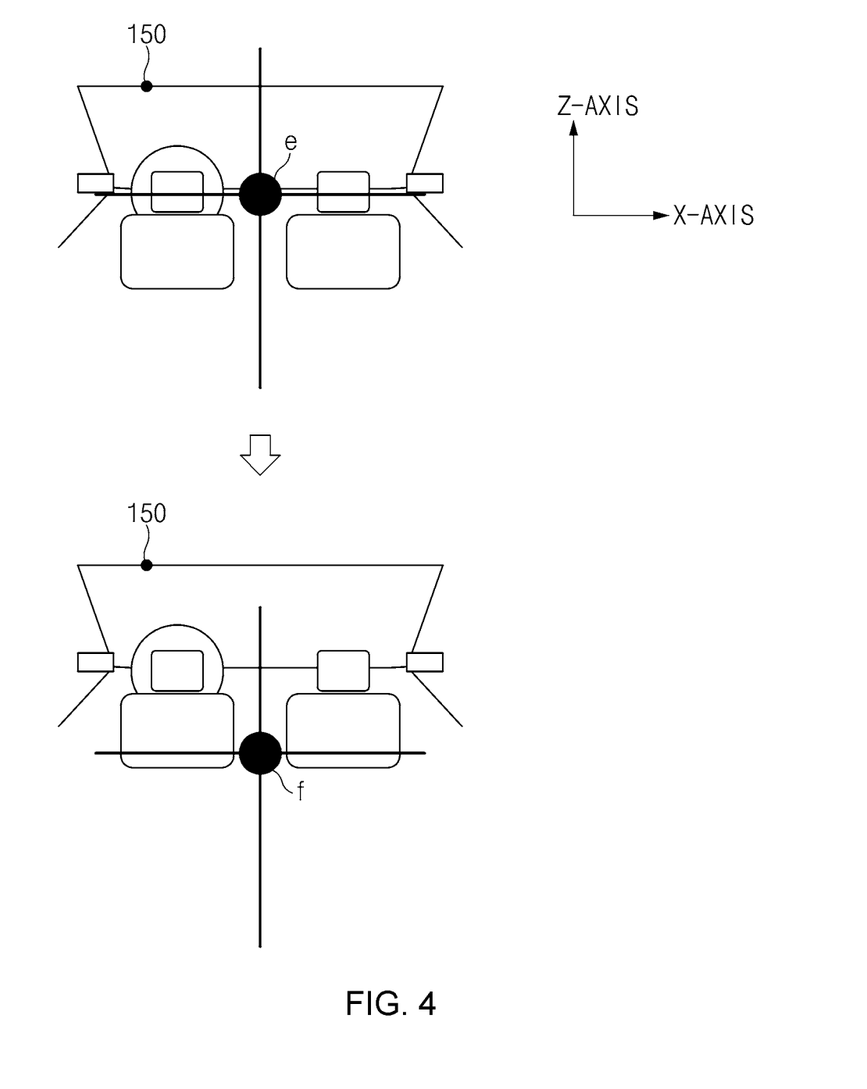
FIG. 4 is a view illustrating another example of the process of changing a sound position of an apparatus for controlling sound in a vehicle according to an exemplary embodiment of the present invention.

FIG. 4 is a view illustrating another example of the process of changing a sound position of an apparatus for controlling sound in a vehicle according to an exemplary embodiment of the present invention.

The processor 175 sets position 'e' as the sound position before picking up sound through the microphone 150. In other words, in the state that the microphone 150 is turned off, the processor 175 set position 'e' as the sound position.

Thereafter, when the microphone 150 is turned on while being operated in a telephone conversation mode or a voice recognition mode, the processor 175 starts to pick up sound through the microphone 150. In the instant case, the processor 175 detects the use of the microphone 150 through the sound detector 171.

When sound is picked up through the microphone 150, the processor 175 changes the sound position from position 'e' to position 'f'. In other words, the processor 175 moves the sound position in the z-axis direction (downwardly).

Figure 5:
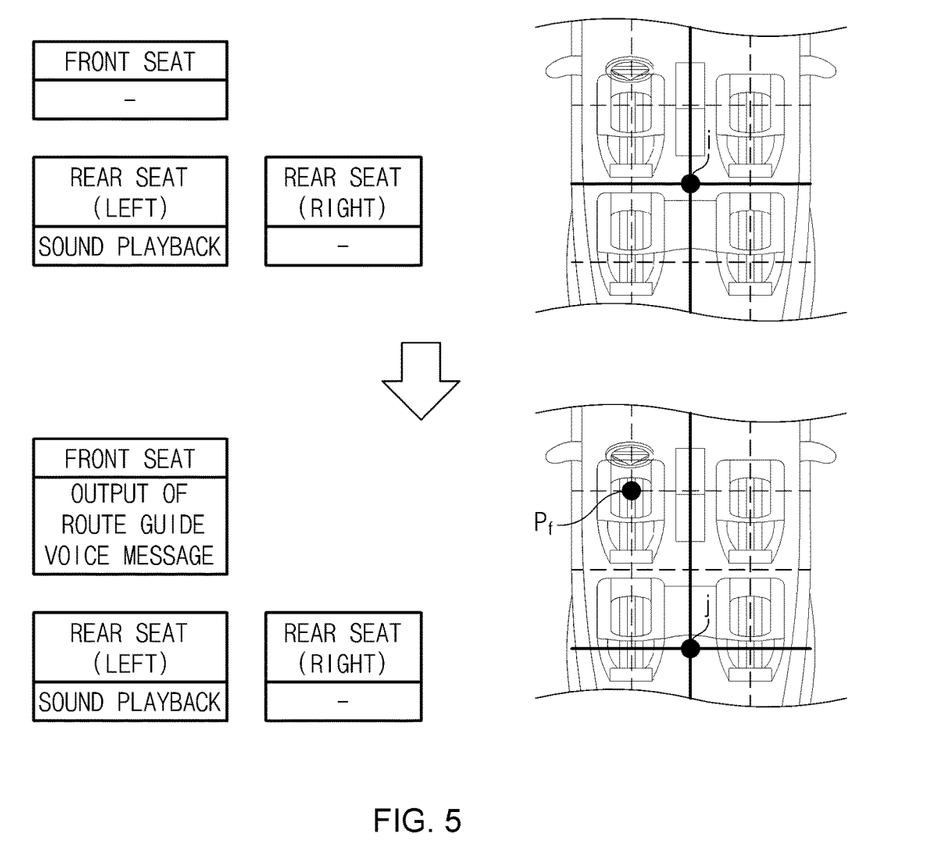
FIG. 5 is a view illustrating still another example of the process of changing a sound position of an apparatus for controlling sound in a vehicle according to an exemplary embodiment of the present invention.

FIG. 5 is a view illustrating still another example of the process of changing a sound position of an apparatus for controlling sound in a vehicle according to an exemplary embodiment of the present invention.

As illustrated in FIG. 5, when the second player 120 in the vehicle reproduces sound, the processor 175 determines that the sound is output from the left rear seat in the vehicle and determines the sound position as position 'i'.

Then, when the navigation system 160 outputs a route message while the sound is output from the left rear seat in the vehicle, the processor 175 moves only the position of the sound, which is output from the second player 120 except for the sound output from the navigation system 160, to position 'j' of the rear seats. That is, the processor 175 sets the sound position as the center between the left and right rear seats.

In the instant case, the sound position of the sound output from the navigation system 160 is determined (set) as the predetermined sound position '$P_f$'. Thus, the route message output from the navigation system 160 is optimally provided to the user sitting on the driver seat, and the sound output from the second player 120 is optimally provided to the user sitting on the left rear seat.

Figure 6:
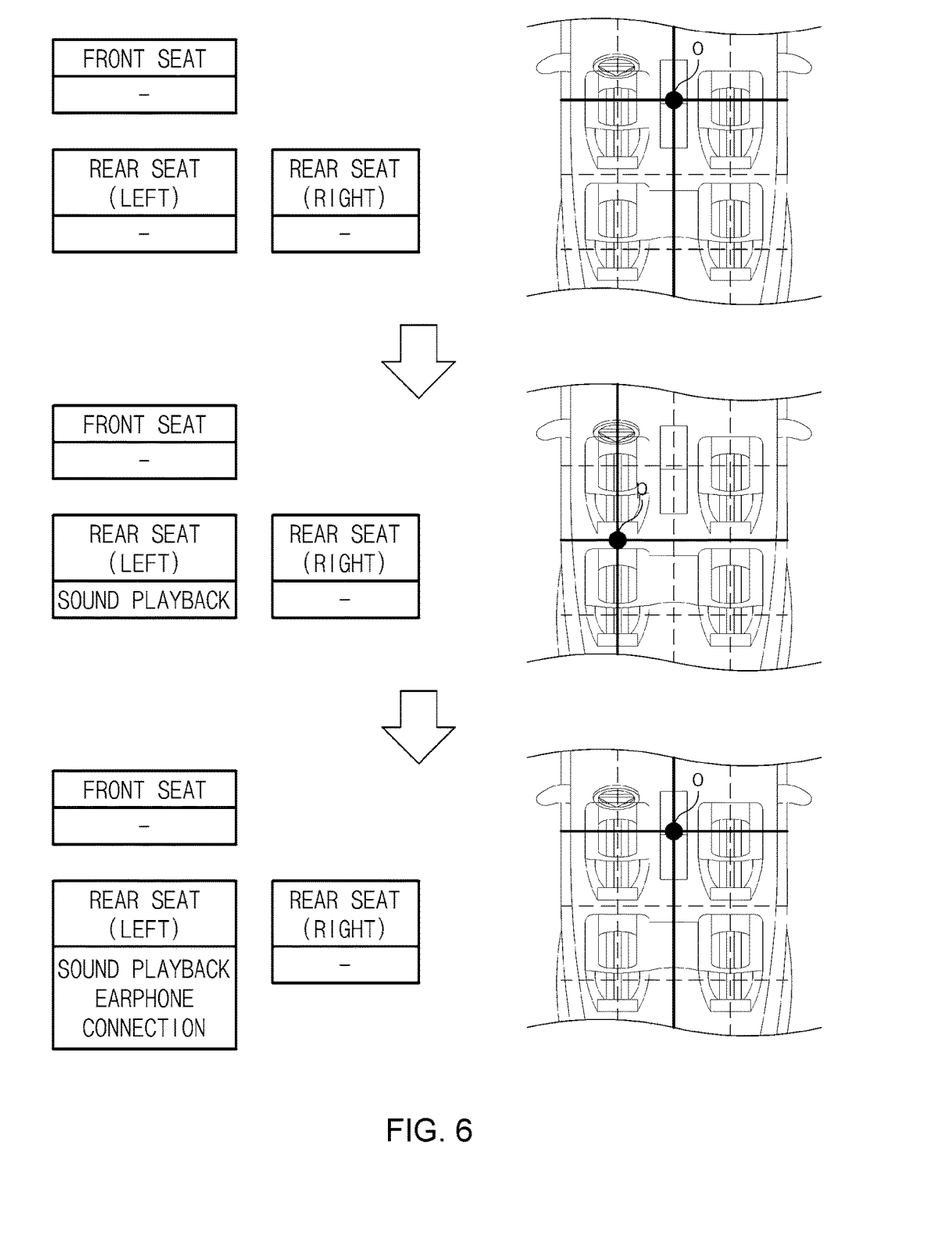
FIG. 6 is a view illustrating one example of the processing of returning a sound position of an apparatus for controlling sound in a vehicle according to an exemplary embodiment of the present invention.

FIG. 6 is a view illustrating one example of the processing of returning a sound position of an apparatus for controlling sound in a vehicle according to an exemplary embodiment of the present invention.

When position 'o' is set in the vehicle as the default sound position, when the second player 120 reproduces sound, the processor 175 detects the fact through the sound detector 171 and determines that the sound is output from the left rear seat of the vehicle. To provide optimal sound to the user sitting on the left rear seat, the processor 175 changes the sound position from position 'o' to position 'p'.

Thereafter, when the user sitting on the left rear seat connects an earphone to the interface 160, the processor 175 detects the connection of the earphone through the external device connection detector 173. When the connection of the earphone is detected, the processor 175 returns the sound position from position 'p' to position 'o'.

Figure 7:
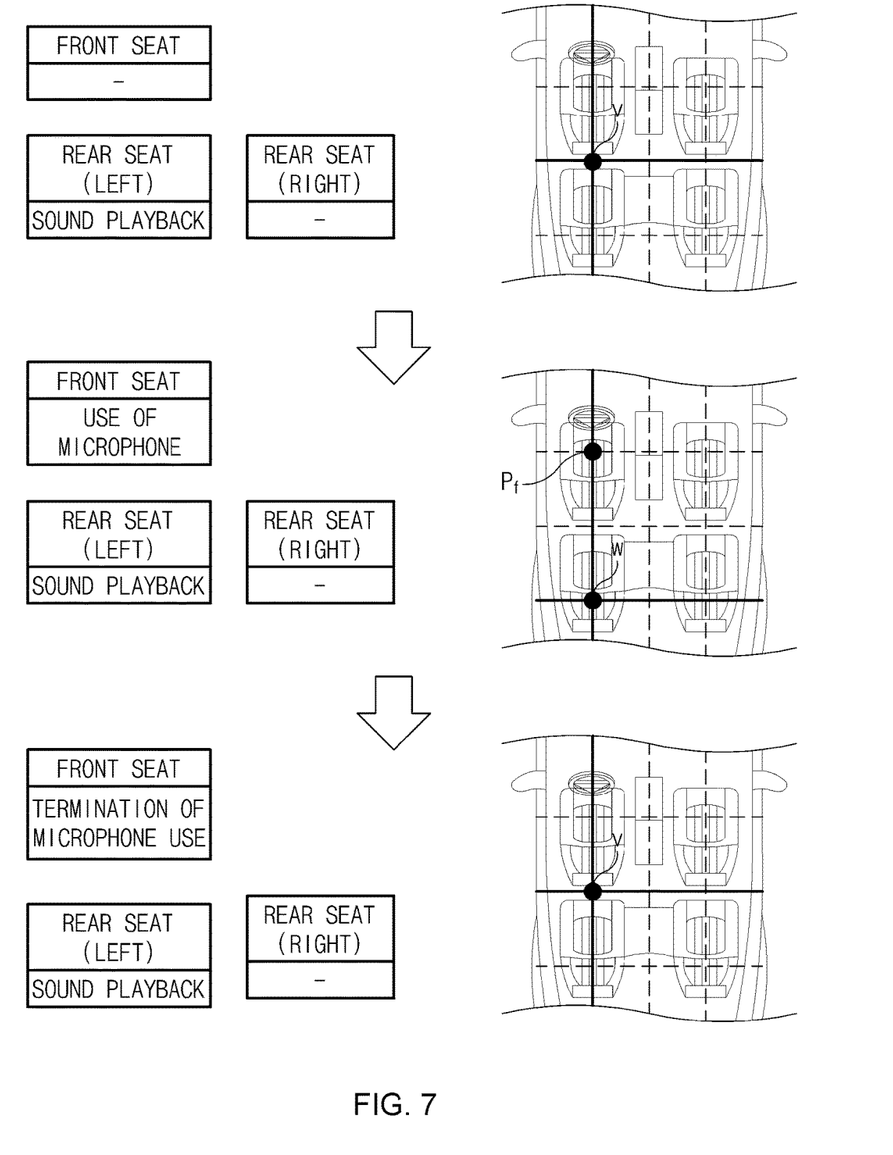
FIG. 7 is a view illustrating another example of the processing of returning a sound position of an apparatus for controlling sound in a vehicle according to an exemplary embodiment of the present invention.

FIG. 7 is a view illustrating another example of the processing of returning a sound position of an apparatus for controlling sound in a vehicle according to an exemplary embodiment of the present invention.

First, when the second player 120 reproduces sound, the processor 175 sets position 'v' which is the center between the driver seat and the left rear seat as the sound position.

In the state that sound is output from the left rear seat in the vehicle, when the user sitting on the front seat (driver seat) uses the microphone 150, the processor 157 detects the use of the microphone 150 through the sound detector 171. Then, when use of the microphone 150 is detected, the processor 175 moves only the position of the sound, which is output from the second player 120 except for the sound output from the microphone 150, from position 'v' to position 'w'. In the instant case, the processor 175 sets the sound position of the sound (voice signal) output as the microphone 150 is used as the predetermined sound position '$P_f$'. Thus, the user may perform telephone conversation through the microphone 150 while being less affected by the sound output from the second player 120.

Thereafter, when the use of the microphone 150 is terminated, the processor 175 returns the sound position from position 'w' to position 'v'. The processor 175 releases the set sound position '$P_f$'.

As described above, a separated DSP is required to separate a sound source for each speaker so that the price of a product is inevitably increased because the material is expensive. However, according to an exemplary embodiment of the present invention, optimal sound may be provided to a user by changing only a sound position while an existing integrated speaker is used.

In the above description, although the sound position is changed in consideration of the sound output position and the connection of the external device, the present invention is not limited thereto, and a pressure sensor mounted on each seat in a vehicle may be used to change the sound position by additionally taking the position of an occupant of a vehicle into consideration.

According to an exemplary embodiment of the present invention, the sound position may be automatically changed based on the position of the sound system that outputs sound in the vehicle. Therefore, an optimal sound may be provided to a user who instructs to output sound.

In addition, according to an exemplary embodiment of the present invention, a sound position may be returned to a previous sound position before the changing of the sound position when a specific event including termination of use of a microphone, use of an earphone, a stop of a route message, and the like occurs.

In addition, according to an exemplary embodiment of the present invention, an optimal sound may be provided to a user by changing only the sound position while using an existing integrated speaker.

In the description above, although all of the components of the embodiments of the present invention may have been explained as assembled or operatively connected as a device, the present invention is not intended to limit itself to such embodiments. Rather, within the objective scope of the present invention, the respective components may be selectively and operatively combined in any numbers. Also, every one of the components may be implemented by itself in hardware while the respective ones can be combined in part or as a whole selectively and implemented in a computer program having program modules for executing functions of the hardware equivalents. Codes or code segments to form such a program may be easily deduced by a person skilled in the art. The computer program may be stored in computer readable media, which in operation can realize the embodiments of the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling sound in a vehicle, the apparatus comprising:
   a plurality of players configured to reproduce multimedia data and output an audio signal to speakers, wherein the plurality of players is installed at different positions in the vehicle;
   a microphone configured to process an audio signal received from an outside to generate electrical voice data;
   a navigation system configured to output a route message;
   a sound detector configured to detect an audio signal output from at least one player among the plurality of players, the microphone and the navigation system and detect an installed position of the at least one player which outputs the detected audio signal as a sound output position; and
   a processor configured to change a sound position by controlling respectively an output gain of the speakers in the vehicle based on the sound output position,
   wherein the processor changes the sound position away from a driver when sound output of the navigation system is detected, changes the sound position away from the microphone when use of the microphone is detected, and returns the sound position to the sound position before the change when the use of the microphone or the sound output of the navigation system is terminated.

2. The apparatus of claim 1, wherein the plurality of players includes:
   a first player located at a front seat in the vehicle;
   a second player located at a left rear seat in the vehicle; and
   a third player located at a right rear seat in the vehicle.

3. The apparatus of claim 1, further including:
   an external device connection detection device configured to detect whether an external device is connected.

4. The apparatus of claim 3, wherein the processor is configured to change the sound position in consideration of the detected sound output position and whether the external device is connected.

5. A method of controlling sound in a vehicle, the method comprising:
   detecting, by a sound detector, an audio signal from at least one player among a plurality of players, a microphone and a navigation system which are installed at different positions in the vehicle to reproduce multimedia, output the audio signal to speakers and detect an installed position of the at least one player which outputs the detected audio signal as a sound output position;
   determining by a processor, whether to change a sound position, based on the sound output position; and
   changing, by the processor, the sound position by controlling respectively an output gain of the speakers in the vehicle based on the sound output position when it is determined to change the sound position,
   wherein the processor changes the sound position away from a driver seat when use of the microphone or sound output of the navigation system is detected, and returns the sound position to the sound position before the change when the use of the microphone or the sound output of the navigation system is terminated.

6. The method of claim 5, further comprising:
   after the detecting of the sound output position, detecting whether an external device is connected.

7. The method of claim 5, wherein the determining of the changing of the sound position includes:
   determining whether to change the sound position based on the sound output position and whether an external device is connected.

\* \* \* \* \*